United States Patent
Lai et al.

(10) Patent No.: US 7,033,391 B2
(45) Date of Patent: Apr. 25, 2006

(54) HIGH REFRACTIVE INDEX SILICONE-CONTAINING PREPOLYMERS WITH BLUE LIGHT ABSORPTION CAPABILITY

(75) Inventors: Yu-Chin Lai, Pittsford, NY (US); Dominic V. Ruscio, Webster, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 206 days.

(21) Appl. No.: 10/657,355

(22) Filed: Sep. 8, 2003

(65) Prior Publication Data

US 2005/0054802 A1    Mar. 10, 2005

(51) Int. Cl.
*A61F 2/16* (2006.01)

(52) U.S. Cl. ............... 623/6.11; 524/588; 526/326; 526/346; 526/279; 528/25; 528/31; 528/32; 528/38; 523/106; 523/107; 623/6.17

(58) Field of Classification Search ........... 252/528; 528/25, 31; 623/6.11, 6.17

See application file for complete search history.

(56) References Cited

U.S. PATENT DOCUMENTS

| | | | |
|---|---|---|---|
| 5,470,932 A | 11/1995 | Jinkerson | |
| 5,528,322 A | 6/1996 | Jinkerson | ............. 351/163 |
| 5,543,504 A | 8/1996 | Jinkerson | ............. 534/856 |
| 5,662,707 A | 9/1997 | Jinkerson | ............. 623/6 |
| 5,891,931 A | 4/1999 | Leboeuf et al. | ......... 522/64 |
| 6,015,842 A | 1/2000 | LeBoeuf et al. | ......... 522/64 |
| 6,194,534 B1 | 2/2001 | Baumann et al. | |
| 6,353,069 B1 | 3/2002 | Freeman et al. | ......... 526/319 |
| 6,878,792 B1 * | 4/2005 | Ichinohe | ............. 528/28 |

FOREIGN PATENT DOCUMENTS

| | | |
|---|---|---|
| EP | 1293541 A | 3/2003 |
| JP | 2000-89171 | 3/2000 |

* cited by examiner

*Primary Examiner*—Marc S Zimmer
(74) *Attorney, Agent, or Firm*—Toan P. Vo

(57) ABSTRACT

A process for producing silicone-containing prepolymers capable of absorbing blue light for use in the production of relatively high refractive index polymeric compositions is described herein. Polymeric compositions so produced are useful in the production of ophthalmic devices such as for example intraocular lenses and corneal inlays.

28 Claims, No Drawings

HIGH REFRACTIVE INDEX SILICONE-CONTAINING PREPOLYMERS WITH BLUE LIGHT ABSORPTION CAPABILITY

FIELD OF THE INVENTION

The present invention relates to high refractive index silicone-containing prepolymers useful in the manufacture of biocompatible medical devices such as intraocular lenses. More particularly, the present invention relates to high refractive index silicone-containing prepolymers having functional groups that aid in blocking blue light, useful in the manufacture of ophthalmic devices.

BACKGROUND OF THE INVENTION

Since the 1940's optical devices in the form of intraocular lens (IOL) implants have been utilized as replacements for diseased or damaged natural ocular lenses. In most cases, an intraocular lens is implanted within an eye at the time of surgically removing the diseased or damaged natural lens, such as for example, in the case of cataracts. For decades, the preferred material for fabricating such intraocular lens implants was poly(methyl methacrylate), which is a rigid, glassy polymer.

Softer, more flexible IOL implants have gained in popularity in more recent years due to their ability to be compressed, folded, rolled or otherwise deformed. Such softer IOL implants may be deformed prior to insertion thereof through an incision in the cornea of an eye. Following insertion of the IOL in an eye, the IOL returns to its original pre-deformed shape due to the memory characteristics of the soft material. Softer, more flexible IOL implants as just described may be implanted into an eye through an incision that is much smaller, i.e., less than 4.0 mm, than that necessary for more rigid IOLs, i.e., 5.5 to 7.0 mm. A larger incision is necessary for more rigid IOL implants because the lens must be inserted through an incision in the cornea slightly larger than the diameter of the inflexible IOL optic portion. Accordingly, more rigid IOL implants have become less popular in the market since larger incisions have been found to be associated with an increased incidence of postoperative complications, such as induced astigmatism.

With recent advances in small-incision cataract surgery, increased emphasis has been placed on developing soft, foldable materials suitable for use in artificial IOL implants. Mazzocco, U.S. Pat. No. 4,573,998, discloses a deformable intraocular lens that can be rolled, folded or stretched to fit through a relatively small incision. The deformable lens is inserted while it is held in its distorted configuration, then released inside the chamber of the eye, whereupon the elastic property of the lens causes it to resume its molded shape. As suitable materials for the deformable lens, Mazzocco discloses polyurethane elastomers, silicone elastomers, hydrogel polymer compounds, organic or synthetic gel compounds and combinations thereof.

In recent years, blue light (400–500 nm) has been recognized as being potentially hazardous to the retina. Accordingly, yellow dyes to block blue light have been used in foldable intraocular lenses, in conjunction with ultraviolet light absorbers, to avoid potential damaging effects. Freeman et al., U.S. Pat. No. 6,353,069, disclose high refractive index copolymers comprising two or more acrylate and/or methacrylate monomers with aromatic groups. Ophthalmic devices made of the copolymers may also include colored dyes, such as the yellow dyes disclosed in U.S. Pat. No. 5,470,932. Such materials exhibit sufficient strength to allow devices made of them, such as intraocular lenses, to be folded or manipulated without fracturing.

Because of shortcomings in the properties of many soft, flexible materials used in the manufacture of ophthalmic devices, such as the formation of water vacuoles or "glistenings", and low refractive index, which requires a lens to be relatively thick in order to provide a lens of proper refractive power, new materials useful in the manufacture of ophthalmic devices are needed.

SUMMARY OF THE INVENTION

Soft, foldable, high refractive index, high elongation, polymeric compositions or silicone elastomers are prepared in accordance with the present invention through a copolymerization process using high refractive index prepolymers having blue light absorption capability. The subject prepolymers have a refractive index of at least 1.42 and more preferably a refractive index of at least 1.45. Prepolymers of the present invention have a structure generally represented by Formula 1 or Formula 2 below:

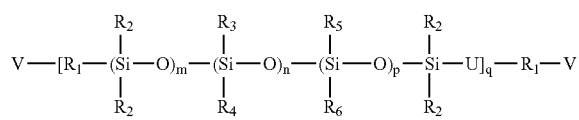

FORMULA 1

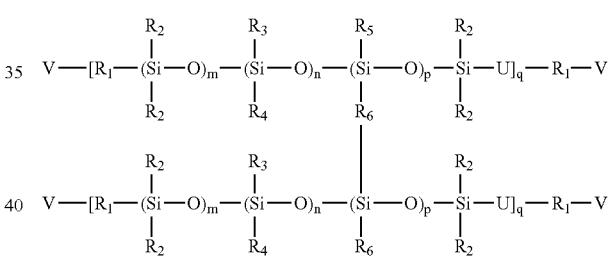

FORMULA 2 wherein the V groups may be the same or different reactive or polymerizable groups; the $R_1$ groups may be the same or different spacer groups or nothing; the $R_2$ groups may be the same or different $C_{1-6}$ alkyl groups; $R_3$ is either $R_2$ or $R_4$; $R_4$ is an aromatic group; $R_5$ is $R_2$, $R_4$ or $R_6$ if $R_6$ is derived from a reactive dye with one ethylenically unsaturated group; $R_6$ is a functional group that absorbs blue light; and m, n, p and q represent the same or different non-negative integers greater than zero, with $p/m+n+p+q<0.05$, or more preferably $<0.01$.

Following preparation of the subject prepolymers using the process of the present invention described in more detail below, the prepolymers are copolymerized to form desirable polymeric compositions useful in the manufacture of biocompatible medical devices such as ophthalmic devices. Such desirable polymeric compositions are transparent, relatively high in strength for durability during surgical manipulation, relatively high in elongation, relatively high in refractive index and particularly well suited for use in the manufacture of ophthalmic devices such as intraocular lens (IOL) implants, contact lenses, keratoprostheses, corneal rings, corneal inlays and the like. Medical devices fabricated from the polymeric compositions or silicone elastomers produced using prepolymers prepared in accordance with the present invention are also capable of absorbing blue light.

Accordingly, it is an object of the present invention to provide a process for the production of transparent, biocompatible polymeric compositions having desirable physical characteristics and relatively high refractive indices.

Another object of the present invention is to provide a process for the production of polymeric compositions having relatively high refractive indices and good clarity.

Another object of the present invention is to provide a process for the production of polymeric compositions suitable for use in the manufacture of ophthalmic devices.

Still another object of the present invention is to provide a process for the production of polymeric compositions suitable for use in the manufacture of intraocular lens implants.

These and other objectives and advantages of the present invention, some of which are specifically described and others that are not, will become apparent from the detailed description and claims that follow.

DETAILED DESCRIPTION OF THE INVENTION

The present invention relates to a novel process for the production of high refractive index prepolymers and the use of such prepolymers to produce biocompatible polymeric compositions having desirable physical properties and relatively high refractive indices for use in the manufacture of ophthalmic devices. The prepolymers of the present invention are represented generally by Formula 1 below:

FORMULA 1

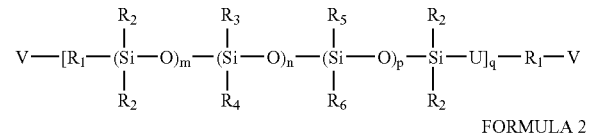

FORMULA 2

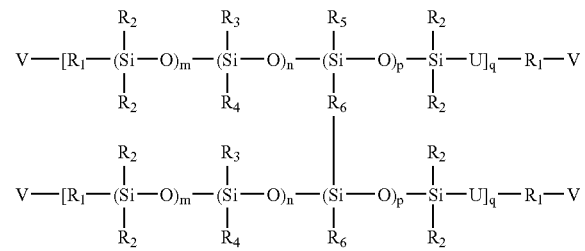

wherein the V groups may be the same or different reactive or polymerizable groups such as for example but not limited to vinyl, allyl, acrylate, methacrylate, acrylamide, methacrylamide, fumarate, maleate or styrene; the $R_1$ groups may be nothing or the same or different spacer groups such as for example but not limited to a $C_{1-12}$ alkylene such for example but not limited to propylene or butylene, or an organic spacing group of up to 12 atoms composed of carbon, hydrogen, silicon, oxygen, nitrogen, phosphorous, sulfur, chloride, bromine or fluorine alone or in any combination; the $R_2$ groups may be the same or different $C_{1-6}$ alkyl groups such as for example but not limited to methyl, butyl or hexyl; $R_3$ is either $R_2$ or $R_4$; $R_4$ is a $C_{6-30}$ aromatic group such as for example but not limited to phenyl or naphthyl; $R_5$ is $R_2$, $R_4$ or $R_6$ if $R_6$ is derived from a reactive dye with one ethylenically unsaturated group; $R_6$ is a functional group that absorbs blue light derived from a reactive yellow azo dye having ethylenically unsaturated groups, such as for example but not limited to vinyl, allyl, acrylate, methacrylate, acrylamide, methacrylamide, fumarate, maleate, itaconate, styrene, nitrile or like functional groups; U is either nothing or a difunctional linkage which renders the prepolymer with multiple blocks of polysiloxane groups such as but not limited to urethane; and m, n, p and q represent the same or different non-negative integers greater than zero, with $p/m+n+p+q<0.05$ or more preferably $<0.01$.

The subject prepolymers of Formulas 1 and 2 may be prepared using various techniques, depending on the specific prepolymer structure desired. For example, when the V groups are vinyl, and assuming the R1 groups are nothing, the R2 groups are methyl groups and the R4 groups are phenyl groups, the prepolymer may be prepared by inserting one or more cyclic groups into 1,3-divinyl tetramethyldisiloxane. Suitable cyclic groups include for example, but are not limited to 1,1,3,3,5,5-hexamethyltrisiloxane (HMTS), 1,1,3,3,5,5,7,7-octamethyltetrasiloxane (OMTS), 1,1,3,3,5,5-hexaphenyltrisiloxane (HPTS), 1,1,3,3,5,5,7,7-octaphenyltetrasiloxane (OPTS), and 1,3,5-trimethyl-1,3,5-triphenyl cyclotrisiloxane (TMTPTS). A mixed cyclic siloxane containing at least one $R_6$ group and any combination of methyl and phenyl groups must be present in any insertion reaction to produce a prepolymer having blue light absorption properties.

A typical prepolymer of Formula 1 may be prepared in accordance with the steps outlined in the following Reaction Scheme 1.

Step 1. Preparation of Cyclics Containing Si-H:

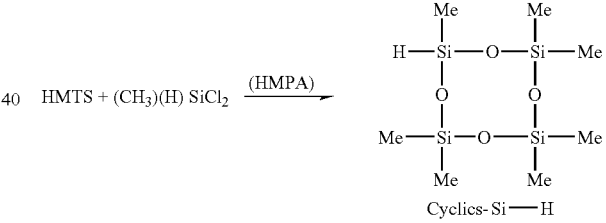

HMPA = hexamethyl phospharamide
Me = methyl group

Step 2. Preparation of Cyclics with Yellow Dye Moiety (Cyclics-$R_6$):

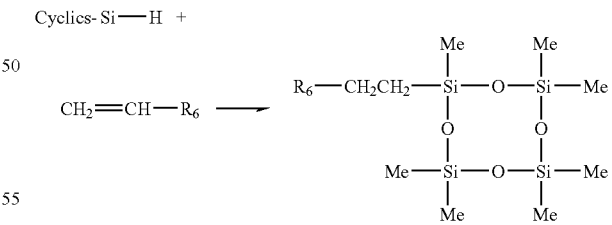

Me = methyl group
$R_6$ = functional group which absorbs blue light (yellow dye moiety)

Step 3. Insertion Reaction of Cyclics with 1,3-divinyltetramethyldisiloxane to Produce Divinyl-Terminated Polysioxane with High Refractive index and with Yellow Dye Moiety:

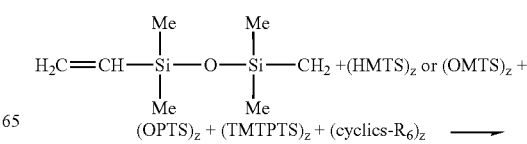

-continued

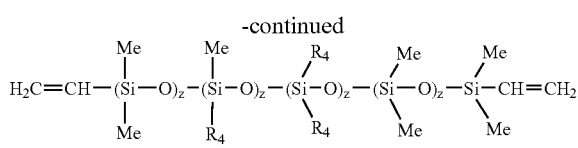

z = the same or differing non-negative integers greater than zero

It should be noted that if dimethyldihydrosilane is used in Step I of Reaction Scheme 1. then two $R_6$ groups could be attached to the same silicon in the siloxane unit in the prepolymer of Formula 1, i.e.1 $R_5$ is $R_6$ provided that $R_6$ comes from a reactive dye with only one ethylenically unsaturated group as described above. Alternatively, if $R_6$ comes from a reactive dye with two ethylenicatly unsaturated groups. Step 2 would produce a dye moiety attached to two units of siloxane cyclics. Such leads to the formation of the prepolymer of Formula 2.

The yellow dye-containing compound with ethylenically unsaturated groups can be any yellow dye having ethylenically unsaturated groups reactive toward Si—H. For example, a representative class of reactive dye has the general structure illustrated by Formula 3 below.

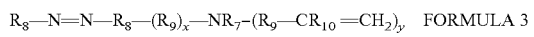

FORMULA 3

Here, $R_7$ is hydrogen when y is 1 or is nothing when y is 2; the $R_8$ groups may be the same or differing $C_{6-30}$ aromatic groups which provide the blue-light absorption characteristics to yellow dye; the $R_9$ groups may be the same or differing spacer groups such as but not limited to $C_{1-12}$ alkylene or carbonyl groups; $R_{10}$ is hydrogen or methyl, x is a non-negative integer and y is either 1 or 2. One specific example of this class of reactive dye functional groups is N-2-[3'-(2''-methylphenylazo)-4'-hydroxyphenyl]ethyl vinylacetamide, illustrated below in Formula 4.

FORMULA 4

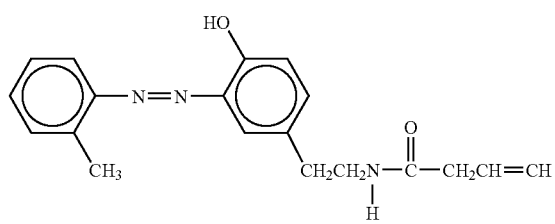

When the reactive dye of Formula 4 is used, a prepolymer of Formula 1 is produced. When a prepolymer of Formula 2 is desired, a reactive dye with two ethylenically unsaturated groups is needed. One example of a reactive dye with two ethylenically unsaturated groups is N,N-bis-(2-vinylacetoxyethyl)-(4'-phenylazo) aniline, illustrated in Formula 5 below.

FORMULA 5

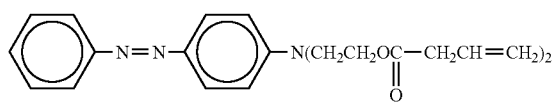

Depending on the nature of the V group of Formula 1, the prepolymers of this invention can be copolymerized with other polymerizable monomers/oligomers through vinyl polymerization, stepwise addition, or hydrosilation to produce a polymer composition useful in the production of medical devices such as intraocular lenses. Blue-light absorbing functional groups should be present in such medical devices in an amount sufficient to provide approximately 50 percent or less light transmittance at 450 nm. The same is described in still greater detail in the Examples provided below.

EXAMPLE 1

Preparation of Si—H—Containing Cyclics 1-hydro-1,3,3,5,5,7,7-heptamethylcyclotetrasiloxane (Step 1)

A dry, clean 3-neck, 500-mL round bottom flask equipped with reflux condenser and nitrogen blanket, is charged with 51.66 grams (0.232 mole) of 1,1,3,3,5,5-hexamethyl cyclotrisiloxane and 25.98 grams (0.232 mole) of dichloromethylhydrosilane. The contents are heated at 60° C. Then hexamethylphosphoric triamide (52 microliter) is added and the reaction mixture is allowed to stir overnight. The mixture is then slowly added to a stirring mixture of 32 grams of water and diethyl ether. The mixture is then placed in a separatory funnel. The organic layer is then separated and washed two times with 5% sodium bicarbonate and 5 times with water until the pH is 7.0. The ether solution is then dried with magnesium sulfate. The solvent is then stripped under vacuum to give product with over 90% purity.

EXAMPLE 2

Synthesis of N-2-[3'-(2''-methylphenylazo)-4'-hydroxyphenyl]ethyl vinylacetamide N-2-[3'-(2''-methylphenylazo)-4'-hydroxyphenyl]ethyl vinylacetamide can be made in two steps. The first step is the formation of 4-vinylacetamidoethyl phenol. The second step is the coupling of azonium salt of toluidine with the phenol to give the product. The detailed procedure can be the same as that found in U.S. Pat. No. 5,470,932, Example 1, except using vinylacetic anhydride rather than methacrylic anhydride. The product is identified by NMR and Mass Spectroscopy.

EXAMPLE 3

Preparation of Cyclics with Yellow Dye Moiety (Step 2)

A 1-L 3-neck round bottom flask equipped with reflux condenser, is charged with 28.2 g (0.1 mole) of 1-hydro-1, 3,3,5,5,7,7-heptamethylcyclotetrasiloxane, (from Example 1), 32.2 g (0.1 mole) of N-2-[3'-(2''-methylphenylazo)-4'-hydroxyphenyl]ethyl vinylacetamide and 500 mL of methylene chloride. After stirring with a magnetic stirrer to bring the mix into a solution, 0.05 g of platinum-divinyltetramethyldisiloxane complex in xylene (2.1–2.4% platinum concentration (Gelest, Inc., Tullytown, Pa.) is added and the mixture is heated to reflux. After 16 hours, the solvent is then mostly removed to get highly concentrated dye solution. It is then passed through silica gel and eluted with methylene chloride/acetonitrile mixture to get purified reactive yellow dye cyclics. The product is further identified by NMR and Mass Spectroscopy.

EXAMPLE 4

Synthesis of αω-bis-vinylpolydimethylsiloxane of Targeted 6,000 Molecular Weight A dry, clean 3-neck, 500-mL round bottom flask equipped with reflux condenser and nitrogen blanket, was charged with 87.46 grams (0.295 mole) of 1,1,3,3,5,5,7,7-octamethyl cyclotetrasiloxane, 2.78 g (0.0149 mole) of 1,3-divinytetramethyldisiloxane and 133 microliter of triflic acid (0.25 weight %). The contents were stirred under nitrogen blanket. After overnight, dissolved the contents in ethyl ether and washed with 0.05N of NaOH in water until the solution reached pH 7.0. The ether solution was then dried with magnesium sulfate. The solvent was then stripped under reduced pressure to give final product. Molecular weight of the prepolymer, (by Size Exclusion Chromatography, using polystyrene standards): Mn=7360, Mw=13200. With 25% cyclics.

EXAMPLE 5

Preparation of Divinyl-Terminated Polysioxane with Refractive Index at Least 1.45 and Having Blue-Blocking Capability A dry, clean 3-neck, 3-L round bottom flask equipped with mechanical stirrer, reflux condenser and nitrogen blanket, is charged with 3.02 g (0.005 mole) of reactive cyclic yellow dye from Example 3, phenyl-1,3,3,5,5,7,7-heptamethyl cyclotetrasiloxane. 73 g (0.01 mole) of α ω-bis-vinylpolydimethylsiloxane from Example 4, 473.6 grams of 1,1,3.3, 5,5,7,7-octamethyl cyclotetrasiloxane, 340 grams of 1,3,-trimethyl-1,3,5-triphenyl cyclotrisiloxane, and 0.139 gram of potassium trimethylsilanolate. The contents are heated with mechanical stirring until it reached 150–160° C. It is then purged with nitrogen for 1–2 minutes. The content is then kept stirred at 160° C. The viscosity starts to increase rapidly. The reaction is terminated after heating overnight. The prepolymer has a theoretical Mn around 88,600. Refractive index should be higher than 1.46. The prepolymer should have yellow dye content about 0.16%.

Soft, foldable, relatively high refractive index of approximately 1.42 or greater, relatively high elongation of approximately 100 percent or greater, polymeric compositions are synthesized using one or more silicone-containing prepolymers produced through the process of the present invention. To produce the subject polymeric compositions, one or more silicone-containing prepolymers produced using the process of the present invention are copolymerized with one or more suitable monomers or oligomers and optionally one or more strengthening agents added to enhance the mechanical properties of the polymeric compositions, one or more crosslinking agents and/or one or more catalysts.

Suitable classes of polymerizable monomers or oligomers include for example but are not limited to high refractive index siloxane-containing acrylates, siloxane-containing methacrylates, aromatic-group-containing acrylates, aromatic-group-containing methacrylates, vinyl- or allyl-containing siloxane monomers having high refractive indices, or vinyl or allyl-containing aromatic monomers.

Suitable strengthening agents for use in the copolymerization of the silicone-containing prepolymer produced in accordance with the process of the present invention includes but is not limited to silica filler or an organosilicon resin such as for example a Q-resin with multiple vinyl groups.

Suitable crosslinking agents for use in the copolymerization of the silicone-containing prepolymer produced in accordance with the process of the present invention include but are not limited to polydimethyl-co-methylhydrosiloxane.

Suitable catalysts for use in the copolymerization of the silicone-containing prepolymer produced in accordance with the process of the present invention includes but is not limited to Pt-silicone complex.

The polymeric compositions manufactured using silicone-containing prepolymers produced through the process of the present invention have refractive indices of approximately 1.42 or greater, relatively low glass transition temperatures of approximately 30 degrees Celsius or less and relatively high elongations of approximately 100 percent or greater. The polymeric compositions with the desirable physical properties described herein are particularly useful in the manufacture of ophthalmic devices such as but not limited to intraocular lenses (IOLs) and corneal inlays due to the capability of absorbing blue light.

IOLs having thin optic portions are critical in enabling a surgeon to minimize surgical incision size. Keeping the surgical incision size to a minimum reduces intraoperative trauma and postoperative complications. A thin IOL optic portion is also critical for accommodating certain anatomical locations in the eye such as the anterior chamber and the ciliary sulcus. IOLs may be placed in the anterior chamber for increasing visual acuity in both aphakic and phakic eyes and placed in the ciliary sulcus for increasing visual acuity in phakic eyes.

The polymeric compositions produced as described herein have the flexibility required to allow ophthalmic devices manufactured from the same to be folded or deformed for insertion into an eye through the smallest possible surgical incision, i.e., 3.5 mm or smaller. It is unexpected that the subject polymeric compositions described herein could possess the ideal physical properties disclosed herein. The ideal physical properties of the subject polymeric compositions are unexpected because high refractive index monomers or copolymers typically lend to polymers that have increased crystallinity and decreased clarity, which does not hold true in the case of the subject polymeric compositions.

One or more suitable ultraviolet light absorbers may optionally be used in the manufacture of the subject polymeric compositions. Such ultraviolet light absorbers include for example but are not limited to 2-[3'-tert-butyl-5'-(3"-dimethylvinylsilylpropoxy)-2'-hydroxyphenyl]5-methoxybenzotriazole or 2-(3'-allyl-2'-hydroxy-5'-methylphenyl) benztriazole.

Medical devices produced using polymeric compositions produced using the process of the present invention may be manufactured in accordance with methods known to those skilled in the art of the specific ophthalmic device being produced. For example, if an intraocular lens is to be produced, the same may be manufactured by methods known to those skilled in the art of intraocular lens production.

Ophthalmic devices such as but not limited to IOLs and corneal inlays manufactured using polymeric compositions produced using the process of the present invention can be of any design capable of being rolled or folded for implantation through a relatively small surgical incision, i.e., 3.5 mm or less. For example, intraocular implants such as IOLs comprise an optic portion and one or more haptic portions. The optic portion reflects light onto the retina and the permanently attached haptic portions hold the optic portion in proper alignment within an eye following implantation. The haptic portions may be integrally formed with the optic portion in a one-piece design or attached by staking, adhesives or other methods known to those skilled in the art in a multipiece design.

The subject ophthalmic devices, such as for example IOLs, may be manufactured to have an optic portion and haptic portions made of the same or differing materials. Preferably, in accordance with the present invention, both the optic portion and the haptic portions of the IOLs are made of the same polymeric composition produced using the process of the present invention. Alternatively however, the IOL optic portion and haptic portions may be manufactured from different materials and/or different formulations of polymeric compositions produced using the process of the present invention, such as described in detail in U.S. Pat. Nos. 5,217,491 and 5,326,506, each incorporated herein in their entirety by reference. Once the material(s) are selected, the same may be cast in molds of the desired shape, cured and removed from the molds. After such molding, the IOLs are then cleaned, polished, packaged and sterilized by customary methods known to those skilled in the art. Alternatively, rather than molding, the IOLs may be manufactured by casting said polymeric composition in the form of a rod; lathing or machining said rod into disks; and lathing or machining said disks into an ophthalmic device prior to cleaning, polishing, packaging and sterilizing the same.

In addition to IOLs, polymeric compositions produced using the process of the present invention are also suitable for use in the production of other ophthalmic devices such as contact lenses, keratoprostheses, capsular bag extension rings, corneal inlays, corneal rings and like devices.

Ophthalmic devices manufactured using polymeric compositions produced using the process of the present invention are used as customary in the field of ophthalmology. For example, in a surgical cataract procedure, an incision is placed in the cornea of an eye. Through the corneal incision the cataractous natural lens of the eye is removed (aphakic application) and an IOL is inserted into the anterior chamber, posterior chamber or lens capsule of the eye prior to closing the incision. However, the subject ophthalmic devices may likewise be used in accordance with other surgical procedures known to those skilled in the field of ophthalmology.

While there is shown and described herein a process for producing silicone-containing prepolymers, and polymeric compositions and ophthalmic devices made from the subject silicone-containing prepolymers, it will be manifest to those skilled in the art that various modifications may be made without departing from the spirit and scope of the underlying inventive concept and that the same is not limited to particular processes and structures herein shown and described except insofar as indicated by the scope of the appended claims.

What is claimed is:

1. Prepolymers comprising:

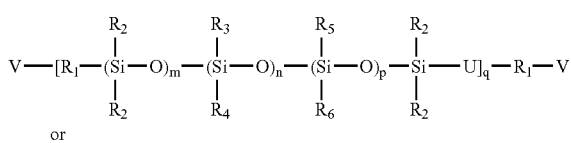

or

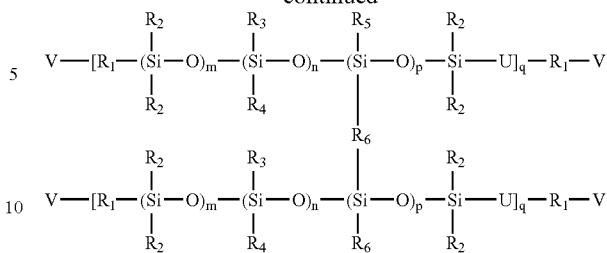

wherein the V groups are the same or different reactive or polymenzable groups; the $R_1$ groups are either absent or, where present, the same or different spacer groups; the $R_2$ groups are the same or different $C_{1-6}$ alkyl groups; $R_3$ is either $R_2$ or $R_4$; $R_4$ is a $C_{6-30}$ aromatic group; $R_5$ is $R_2$, $R_4$ or $R_6$; $R_6$ is a functional group that absorbs blue light; U is absent or, when present, a difunctional linkage; and m, n, p and q represent the same or different non-negative integers greater than zero.

2. The prepolymers of claim 1 wherein said V groups are selected from the group consisting of vinyl, allyl, acrylate, methacrylate, acrylamide, methacrylamide, fumarate, maleate and styrene.

3. The prepolymers of claim 1 wherein said $R_1$ groups are selected from the group consisting of nothing, a $C_{1-12}$ alkylene and an organic spacing group of up to 12 atoms.

4. The prepolymers of claim 3 wherein said organic spacing group is composed of carbon, hydrogen, silicon, oxygen, nitrogen, phosphorous, sulfur, chloride, bromine or fluorine, alone or in any combination.

5. The prepolymers of claim 1 wherein said $R_6$ group is derived from a reactive yellow dye.

6. The prepolymers of claim 1 wherein said $R_6$ group is derived from a reactive yellow dye with ethylenically unsaturated groups selected from the group consisting of vinyl, allyl, acrylate, methacrylate, acrylamide, methacrylamide, fumarate, maleate, itaconate, styrene and nitrile.

7. The prepolymers of claim 1 wherein said U group is urethane.

8. A polymeric composition produced through the copolymerization of one or more prepolymers of claim 1 with one or more monomers or oligomers.

9. A polymeric composition produced through the copolymerization of one or more prepolymers of claim 1 with one or more monomers or oligomers, one or more strengthening agents, one or more crosslinking agents and one or more catalysts.

10. The polymeric composition of claim 8 or 9 wherein said one or more monomers or oligomers are selected from the group consisting of siloxane-containing acrylates, siloxane-containing methacrylates, aromatic-group-containing acrylates, aromatic-group-containing methacrylates, vinyl- or allyl-containing siloxane monomers, and vinyl or allyl-containing aromatic monomers.

11. The polymeric composition of claim 9 wherein said strengthening agent is selected from a group consisting of a silica filler and a siloxane-based resin with at least one vinyl group.

12. The polymeric composition of claim 9 wherein said strengthening agent is a silica filler.

13. The polymeric composition of claim 9 wherein said strengthening agent is a siloxane-based resin with at least one vinyl groups.

14. The polymeric composition of claim 9 wherein said crosslinking agent is polydimethyl-co-methylhydrosiloxane.

15. The polymeric composition of claim 9 wherein said catalyst is Pt-silicone complex.

16. A process for producing the prepolymers of claim 1 comprising:
   producing a silicone-containing cyclic compound;
   adding a reactive dye moiety to said cyclic compound; and
   reacting said cyclic compound with a divinyl siloxane.

17. A process for producing a polymeric composition comprising:
   polymerizing one or more prepolymers of claim 1 with one or more monomers or oligomers.

18. A process for producing a polymeric composition comprising:
   polymerizing one or more prepolymers of claim 1 with one or more monomers or oligomers, one or more strengthening agents, one or more crosslinking agents and one or more catalysts.

19. The process of claim 17 or 18 wherein said one or more monomers or oligomers are selected from the group consisting of siloxane-containing acrylates, siloxane-containing methacrylates, aromatic-group-containing acrylates, aromatic-group-containing methacrylates, vinyl- or allyl-containing siloxane monomers, and vinyl or allyl-containing aromatic monomers.

20. The process of claim 18 wherein said strengthening agents are selected from a group consisting of silica filler and siloxane-based resins with at least one vinyl group.

21. The process of claim 18 wherein said strengthening agents are a silica filler.

22. The process of claim 18 wherein said strengthening agents are a siloxane-based resin with at least one vinyl group.

23. A method of producing an ophthalmic device using the polymeric composition produced through the process of claim 17 or 18 comprising:
   casting said polymeric composition into a shaped body.

24. A method of using the ophthalmic device produced through the method of claim 23 comprising implanting said ophthalmic device in an eye.

25. A method of producing an ophthalmic device using a polymeric composition produced from one or more of the prepolymers of claim 1 comprising:
   casting said polymeric composition into a shaped body.

26. A method of using the ophthalmic device produced through the method of claim 25 comprising:
   implanting said ophthalmic device in an eye.

27. A medical device containing one or more of the prepolymers of claim 1.

28. An intraocular lens containing one or more of the prepolymers of claim 1.

* * * * *